Dec. 21, 1954

G. GUIGAS 2,697,515

SHAPE GRADER

Filed July 25, 1952

4 Sheets-Sheet 1

INVENTOR.

BY *Gustav Guigas*
*Bryan Beecher*
ATTORNEY

Dec. 21, 1954     G. GUIGAS     2,697,515
SHAPE GRADER

Filed July 25, 1952     4 Sheets-Sheet 3

INVENTOR.
Gustav Guigas
ATTORNEY

Dec. 21, 1954

G. GUIGAS 2,697,515

SHAPE GRADER

Filed July 25, 1952

4 Sheets-Sheet 4

INVENTOR.
Gustav Guigas
BY
ATTORNEY

United States Patent Office 2,697,515
Patented Dec. 21, 1954

2,697,515
SHAPE GRADER

Gustav Guigas, Honolulu, Territory of Hawaii, assignor to Hawaiian Pineapple Company, Limited, Honolulu, Territory of Hawaii, a corporation of Hawaii Application July 25, 1952, Serial No. 300,889

6 Claims. (Cl. 209—100)

My invention relates to apparatus for grading objects by shape as opposed to size or weight, and more particularly concerns such an apparatus which is adapted to separate objects which are approximately cylindrical in form from objects which are more cone-shaped than cylindrical. The invention is considered especially valuable as applied in the shape grading of pineapples; in fact, it is an outgrowth of recent studies indicating that substantial economies could be effected in the pineapple canning industry, should it be possible to develop an apparatus capable of separating the relatively long, tapered fruit from the short, squat variety, from which more full diameter slices can be realized.

Figure 1:
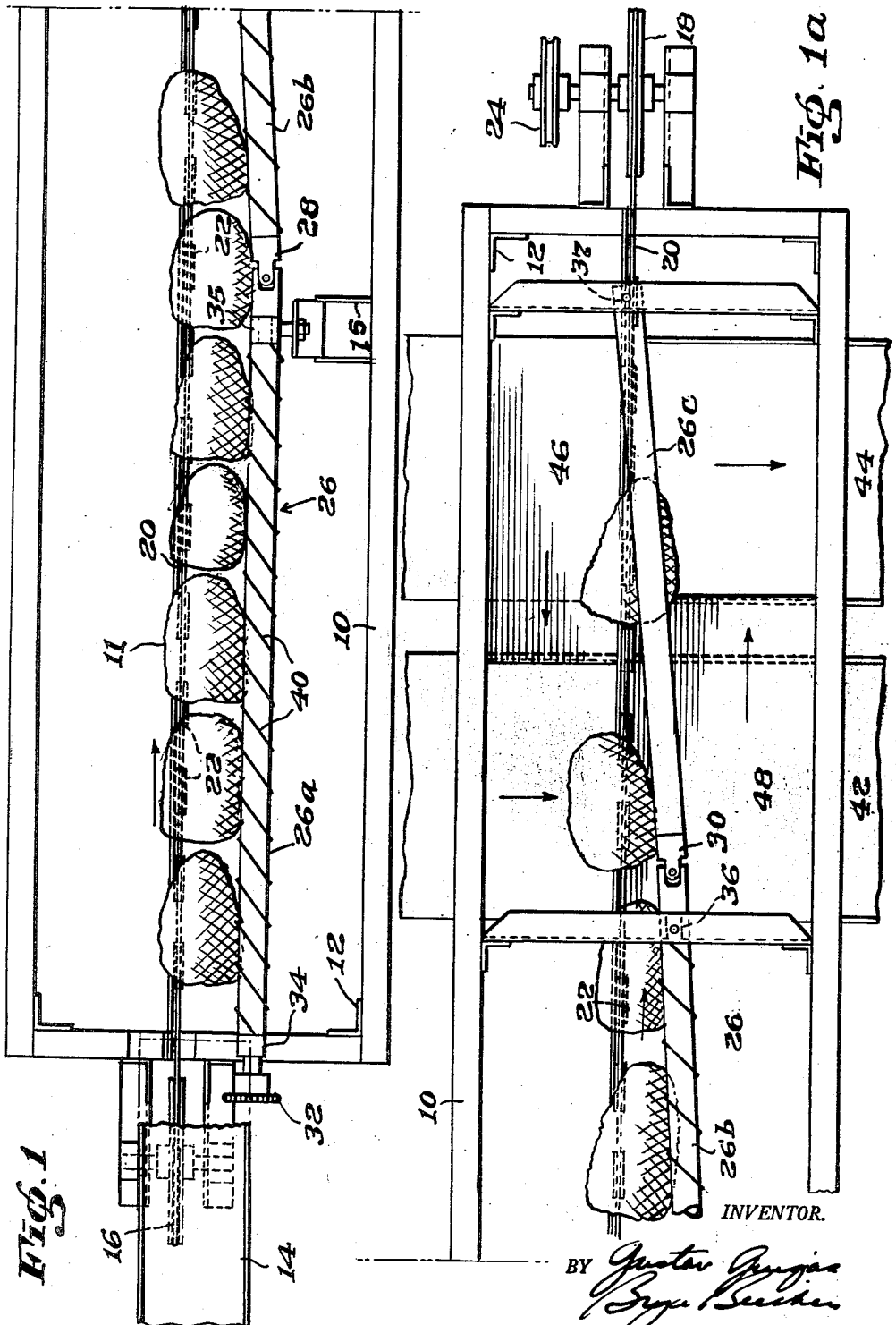
Figure 2:
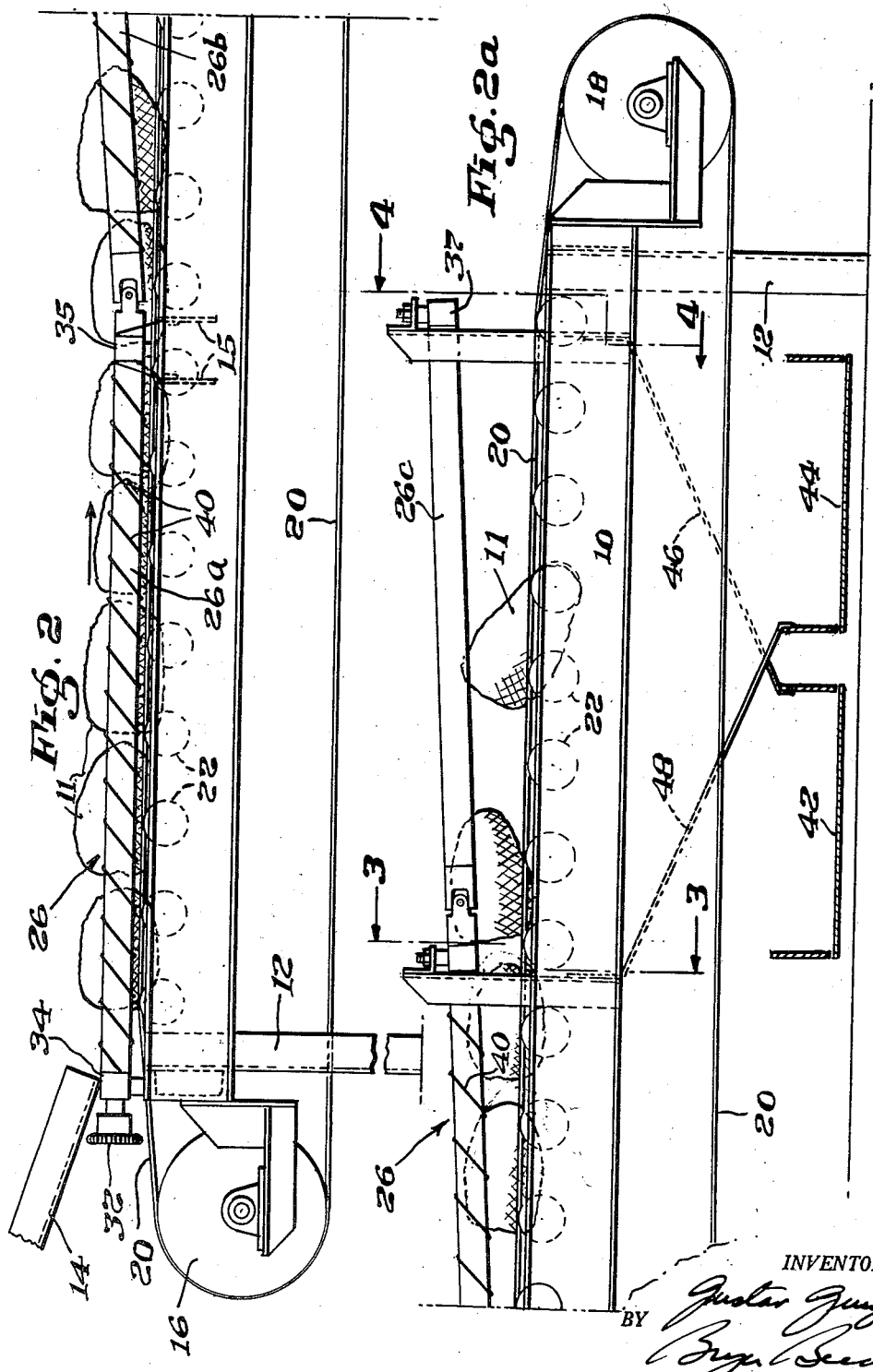
Figure 3:
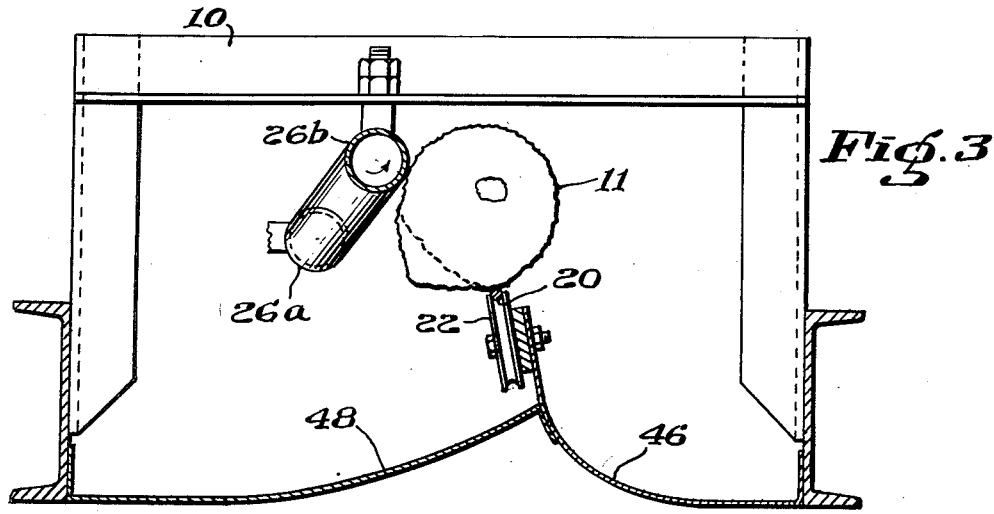
Figure 4:
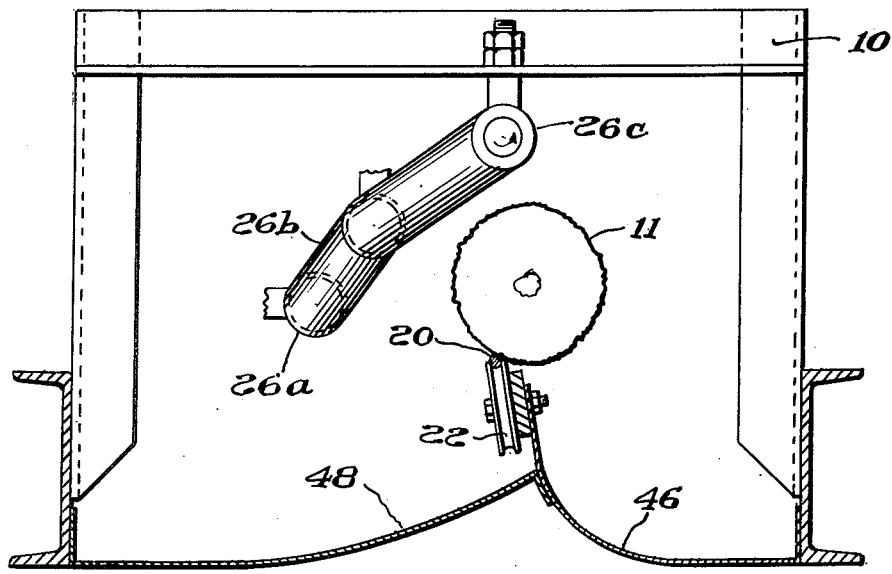

The invention will be described in terms of its present preferred embodiment, as illustrated by the accompanying drawings, in which, Figs. 1 and 1a show the apparatus in plan;
Figs. 2 and 2a show the apparatus in side elevation;
Figs. 3 and 4 are sections on the lines indicated in Fig. 2a; and
Figs. 5 and 5a refer to a modification.

Referring first to the principal figures, i. e., Figs. 1 and 1a and Figs. 2 and 2a, it will be observed that the apparatus includes a rectangular frame 10 of angle iron construction, supported on legs 12. The pineapples 11 are delivered to the apparatus by means shown as a chute 14, positioned at the lefthand end of the frame 10. Alternatively, a side feed scheme utilizing, for example, a chute of substantial width may be employed; in fact, the illustrated apparatus is particularly designed to allow for this method of feeding the fruit should it be considered desirable, that portion thereof to the left of the bracket 15 (Fig. 1) being longer than would otherwise be necessary. Using a side chute feed, the chute is positioned along the side opposite the bracket 15. The grader when mounted in multiple would normally be supplied with fruit from a belt or slat type conveyor in conjunction with chute 14.

Mounted at each end of the frame 10 is a sheave 16, 18, these sheaves being interconnected by an endless cable 20, under-supported mediate the sheaves 16, 18 by auxiliary sheaves 22, the latter being canted to the left, as the apparatus appears in the sectional views afforded by Figs. 3 and 4. In operation, movement of cable 20 in the indicated direction is effected by power means linked to the V-belt sheave 24, which is fixed to the shaft carrying the sheave 18.

In addition to the parts previously noted, the apparatus comprises an articulated shaft 26 consisting, as shown, of three sections 26a, 26b, and 26c, section 26b being joined to the other sections through universal joints 28 and 30. At its left-hand end section the shaft 26, which partially supports and aids in the conveyance of the fruit, mounts a sprocket 32 so that the shaft, in operation of the apparatus, may be caused to rotate counter-clockwise (Figs. 3 and 4) in bearings 34, 35, 36, and 37. Sections 26a and 26b of shaft 26 each carry thereon a length of wire or rope 40, wound spirally about the section to assist the same in properly engaging the fruit. Alternatively, these sections, of course, may be formed with corresponding spiral ridges.

Figure 5:
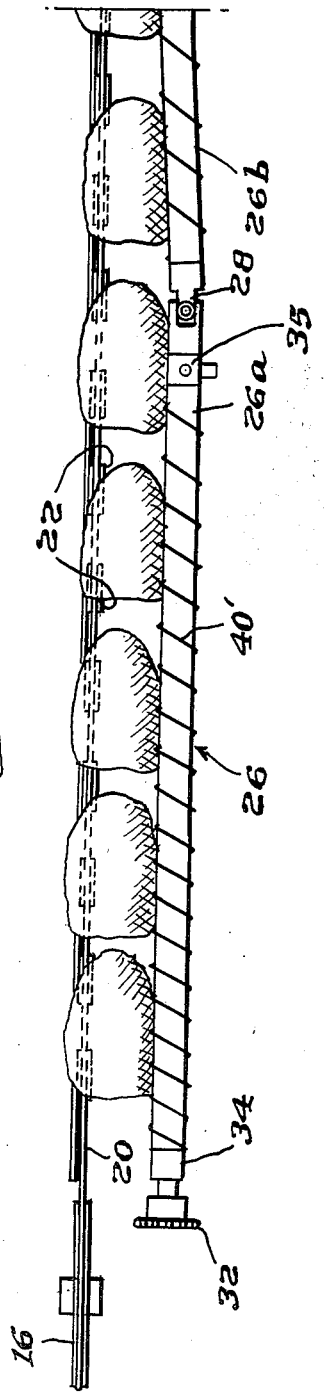
Figure 5A:
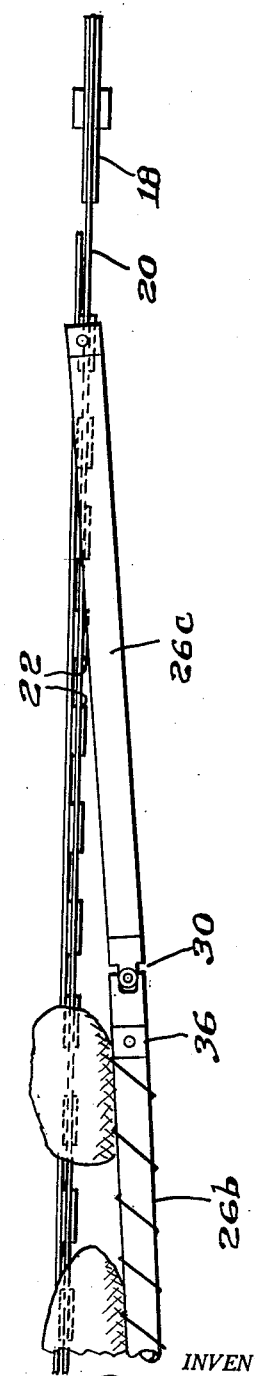

It will be noted that the spiral winding 40 is of greater pitch on section 26b than on section 26a to the end of accelerating the forward motion of the fruit and of increasing the space between the individual pineapples. This increase in the spacing operates to preclude contact between the pineapples in the critical separation area. If desired, the same effect may be obtained by progressively increasing the pitch of the threading over the combined lengths of both sections as shown in Fig. 5.

Cable 20 will be observed as following a straight and level course through the frame. Shaft 26, on the other hand, beginning with section 26b, extends progressively inwardly and upwardly of the frame to the end that at the point of termination of the shaft the same is positioned immediately above the cable 20.

Beneath the body of the frame member 10 at the right-hand end thereof is a pair of discharge chutes 42, 44, served respectively by catch pans 46, 48. Pan 46 receives the cylindrical fruit; pan 48 the tapered fruit.

The disposition of the shaft 26 relative to the cable 20, particularly beyond the point marked by the bracket 15, which supports the bearing 35, is the keynote of the invention. Beyond such point, the shaft 26, which it should be remembered is rotating counter-clockwise, having regard to the sectional views, begins to move laterally toward, but vertically away from, the cable to gradually transfer the entire burden of the fruit to the latter.

As the gap between the cable and the shaft widens the tapered fruit, due to the fact that its center of gravity does not coincide with its point of maximum diameter, pivot on its lesser axes as shown in Fig. 3, before the shaft has lost contact therewith. With the greater portion of the weight of the fruit to the left of the cable, the fruit falls gently into the pan 48 at or slightly before the shaft assumes its position immediately above the cable (Fig. 4).

When the fruit is relatively cylindrical the center of gravity thereof more closely coincides with the point of maximum diameter of the fruit, with the result that the fruit does not pivot but remains in substantial axial parallelism with the cable until it topples into the pan 46 by force of the influence of the direction of rotation of the shaft.

Although the canted mounting of the auxiliary sheaves 22 assists in the attainment of the desired action, such mounting is not considered critical.

My invention is not to be restricted to the precise details of construction shown in the drawings, since various changes and modifications may be made including changes and modifications other than those specifically mentioned without departing from the scope of the invention or sacrificing the advantages derived from its use.

I claim:

1. A shape grader for separating generally cylindrical objects from generally conical objects comprising an assembly including a conveyor member having a generally horizontal supporting surface relatively narrow with respect to the diameter of said objects, and an axially rotatable elongated support member spaced from said conveyor member at the feed end by a distance less than the diameter of said objects and displaced laterally from said conveyor member at the feed end to cradle said objects between said conveyor member and said supporting member, the spacing between said members increasing to a distance greater than the diameter of said objects toward the delivery end and the lateral displacement of said supporting member from said conveyor member decreasing toward the delivery end to permit the generally cylindrical objects to fall from said assembly at one side of said conveyor member and to permit the generally conical objects to pivot about their minor axes between said members and to fall from said assembly at the other side of said conveyor member as they approach the delivery end.

2. A shape grader for separating generally cylindrical objects from generally conical objects comprising an assembly including a conveyor having a generally horizontal reach with a supporting surface relatively narrow with respect to the diameter of said objects and an elongated axially rotatable supporting member laterally spaced from said reach of the conveyor member at the feed end by a distance less than the diameter of said objects to cradle said objects between said members, said supporting member extending progressively upwardly and inwardly over said conveyor member toward the delivery end thereof with the distance between said members progressively increasing until it is greater than the diameter of said objects, and means for rotating said supporting member so that surface thereof closest to said conveyor member at the feed end is moving upwardly.

3. A shape grader for separating generally cylindrical objects from generally conical objects comprising an assembly including a conveyor having a generally horizontal reach with a supporting surface relatively narrow with respect to the diameter of said objects and an elongated axially rotatable supporting member laterally spaced from said reach of the conveyor member at the feed end by a distance less than the diameter of said objects to cradle said objects between said members, said supporting member extending progressively upwardly and inwardly over said conveyor member toward the delivery end thereof with the distance between said members progressively increasing until it is greater than the diameter of said objects, means for receiving said conical objects from said assembly at the side of the conveyor adjacent said supporting member, and means for receiving said cylindrical objects from said assembly at the other side thereof.

4. A shape grader as defined in claim 3 in which said supporting member is provided with a helical rib extending thereabout.

5. A shape grader as defined in claim 4 in which the pitch of said helical rib progressively increases toward the delivery end.

6. A pineapple shape grader for separating generally cylindrical pineapples from generally conical pineapples comprising an endless cable conveyor having a generally horizontal upper reach, and elongated generally cylindrical axially rotatable helically ribbed supporting member laterally spaced from said reach at the feed end by a distance less than the diameter of said pineapples to cradle said pineapples between said reach and said supporting member, said supporting member diverging from said reach to a distance greater than the diameter of said pineapples adjacent the delivery end, said supporting member lying in a generally helical course extending around said reach to intersect the vertical plane of said reach adjacent the delivery end, and means for rotating said supporting member about its axis so that the surface thereof adjacent said reach at the feed end is moving upwardly, whereby the cylindrical pineapples advancing along said cable reach are toppled off said cable on one side thereof and the advancing conical pineapples pivot about their minor axes between said cable and said supporting member to fall off said cable on the other side thereof at a point along said upper reach beyond the point at which the cylindrical pineapples topple off.

References Cited in the file of this patent

UNITED STATES PATENTS

| Number | Name | Date |
|---|---|---|
| 458,422 | Ish | Aug. 25, 1891 |
| 1,735,795 | Robbins | Nov. 12, 1929 |
| 1,969,138 | Kimsey | Aug. 7, 1934 |